United States Patent [19]

Miwa et al.

[11] Patent Number: 5,648,424

[45] Date of Patent: Jul. 15, 1997

[54] THERMOPLASTIC RESIN COMPOSITION AND MOLDED PRODUCT THEREOF

[75] Inventors: Chiyo Miwa; Hironari Sano; Koji Nishida; Yoshihiro Kurasawa, all of Yokkaichi, Japan

[73] Assignee: Mitsubishi Chemical Corporation, Tokyo, Japan

[21] Appl. No.: 553,241

[22] Filed: Nov. 7, 1995

Related U.S. Application Data

[63] Continuation of Ser. No. 235,715, Apr. 29, 1994, abandoned.

[30] Foreign Application Priority Data

Apr. 30, 1993 [JP] Japan .................................. 5-103978
Jul. 27, 1993 [JP] Japan .................................. 5-203732

[51] Int. Cl.$^6$ .............................. C08L 23/00; C08L 71/12
[52] U.S. Cl. .......................... 525/92 D; 525/132; 525/133
[58] Field of Search ........................... 525/92 D, 132, 525/133

[56] References Cited

U.S. PATENT DOCUMENTS

| | | | |
|---|---|---|---|
| 4,102,854 | 7/1978 | Gergen et al. | 525/92 |
| 4,460,743 | 7/1984 | Abe et al. | 525/68 |
| 4,480,057 | 10/1984 | Sano | 525/92 |
| 4,764,559 | 8/1988 | Yamauchi et al. | 525/92 |
| 4,824,915 | 4/1989 | Aycock et al. | 525/397 |
| 4,863,997 | 9/1989 | Shibuya et al. | 525/92 |
| 4,972,021 | 11/1990 | Lee, Jr. | 525/92 |
| 5,061,746 | 10/1991 | Gallucci et al. | 525/132 |
| 5,069,818 | 12/1991 | Aycock et al. | 525/397 |
| 5,262,480 | 11/1993 | Lee, Jr. | 525/92 |
| 5,336,732 | 8/1994 | Samuels | 525/397 |

*Primary Examiner*—Thomas Hamilton, III
*Attorney, Agent, or Firm*—Oblon, Spivak, McClelland, Maier & Neustadt, P.C.

[57] ABSTRACT

Disclosed is a molded product of a thermoplastic resin composition which comprises:

(a) a non-crystalline thermoplastic resin, (b) a crystalline thermoplastic resin and (c) an inorganic filler, if necessary, wherein a portion in which Component (a) takes a structure forming a matrix and a portion in which Component (b) takes a structure forming a matrix coexist.

7 Claims, 6 Drawing Sheets

THERMOPLASTIC RESIN COMPOSITION AND MOLDED PRODUCT THEREOF

This application is a Continuation of application Ser. No. 08/235,715, filed on Apr. 29, 1994, now abandoned.

BACKGROUND OF THE INVENTION

This invention relates to a thermoplastic resin composition having an excellent balance in various properties, and a molded product thereof. More specifically, this invention relates to a thermoplastic resin composition in which mechanical strength, heat resistance, moldability, appearance of a molded product, chemical resistance and dimensional characteristics are excellent by making a portion in which a non-crystalline thermoplastic resin (e.g. a non-crystalline thermoplastic resin comprising a polyphenylene ether (hereinafter referred to as "PPE") or PPE and an aromatic vinyl compound polymer) takes a structure forming a matrix and a portion in which a crystalline thermoplastic resin (e.g. a crystalline thermoplastic resin comprising a polyolefin type resin) takes a structure forming a matrix coexist and, if necessary, making an inorganic filler exist in a specific phase, and a molded product thereof.

A polymer blend comprising a combination of two or more resins has a characteristic that a well-balanced composition can be obtained by using good properties of the respective resins and compensating undesirable properties thereof. Excellent effects in practical use can be obtained particularly by a combination of a crystalline thermoplastic resin and a non-crystalline thermoplastic resin so that various combinations thereof have been made.

A non-crystalline thermoplastic resin is an useful resin generally having excellent heat resistance and dimensional stability. For example, PPE has excellent heat resistance and impact resistance. However, PPE has extremely poor moldability so that PPE has a drawback that it is extremely difficult to carry out injection molding of PPE when it is used alone. In order to remove such a drawback, materials having a relatively good balance of moldability, impact resistance and heat resistance have been developed by formulating a polystyrene type resin into PPE, and the materials are commercially available as engineering plastics.

For example, there has been disclosed a composition of PPE and a high impact polystyrene in U.S. Pat. No. 3,383, 435. In this composition, although moldability is improved, solvent resistance is poor and a balance between heat resistance and impact resistance is insufficient. Also, a composition in which impact resistance is improved by formulating a polystyrene resin and rubber or a rubber-modified polystyrene resin into PPE and making the average particle size of the rubber 0.5 to 2 µm has been disclosed in Japanese Provisional Patent Publication No. 28659/1976, and a composition in which a polystyrene resin and rubber or a rubber-modified polystyrene resin is formulated into PPE and a gel fraction rate is specified has been disclosed in Japanese Provisional Patent Publication No. 460/1981. In these compositions, although impact resistance is improved, rates of sink mark and warpage after molding are large, and surface impact resistance which is practical strength is insufficient.

In the field where high rigidity is required, a non-crystalline thermoplastic resin has been filled with a fibrous inorganic filler such as glass fiber and carbon fiber or a plate-shaped inorganic filler such as talc and mica. Also in this case, a drawback that solvent resistance is poor remains unsolved and a further drawback that moldability is bad is more remarkable.

A crystalline thermoplastic resin has excellent solvent resistance and moldability and has been used in many fields. For example, a polyolefin type resin has excellent organic solvent resistance and moldability so that, for example, a polypropylene type resin has widely been used for parts for automobiles, household electric appliances and daily necessaries. However, said resin has insufficient dimensional stability due to large thermal expansion coefficient and poor heat resistant rigidity so that it cannot be used for large-sized parts in which heat resistance is required, particularly a fender and a wheel cover of an automobile, whereby its application is limited. In order to remove such a drawback, for example, a technique of formulating talc which is an inorganic filler has been studied, but when talc is formulated, there is a problem that impact resistance is lowered. For the purpose of improving a balance of dimensional stability and impact resistance described above, a composition in which talc and ethylene-propylene rubber are formulated has been disclosed in Japanese Provisional Patent Publication No. 3420/1985, and compositions in which appearance is improved by adding polyethylene have been disclosed in Japanese Provisional Patent Publications No. 49252/1984, No. 276840/1986 and No. 65223/1988, respectively. However, even in molded products using these compositions, a balance of mechanical strength, appearance of a molded product and dimensional stability is not necessarily sufficient and there is a problem that surface hardness is low.

In the field where high rigidity is required, a crystalline thermoplastic resin has been filled with a fibrous inorganic filler such as glass fiber and carbon fiber or a plate-shaped inorganic filler such as talc and mica. When said resin is filled with such an inorganic filler, there is a serious drawback that a molded product is warped.

For the purpose of obtaining a material having both of excellent heat resistance and mechanical properties of PPE and excellent solvent resistance and good moldability of a polyolefin type resin, there have been proposed compositions in which both resins are formulated. For example, it has been attempted to improve solvent resistance and impact resistance by formulating PPE and a polyolefin type resin in Japanese Provisional Patent Publication No. 7069/1967. However, in the resulting composition, the amount of the polyolefin type resin formulated is small so that a matrix substantially comprises PPE, whereby effects of improving solvent resistance and moldability are insufficient. Further, when the amount of the polyolefin type resin to be formulated is increased, compatibility of both resins is insufficient so that there is a problem that laminar peeling of a molded product is caused to lower mechanical properties. As an attempt to improve said compatibility, compositions to which a styrene-butadiene block copolymer or a hydrogenated product thereof is added have been disclosed in, for example, Japanese Provisional Patent Publications No. 225642/1988, No. 245353/1988, No. 40556/1989 and No. 93647/1989.

However, in these compositions, a matrix substantially comprises PPE or a combination of PPE and a styrene type block copolymer so that there is a drawback that characteristics of a polyolefin type resin cannot be exhibited sufficiently.

Also, a composition comprising a polyolefin type resin as a matrix and PPE having excellent heat resistance and dimensional stability being dispersed therein has been disclosed. For example, a composition having excellent molding processability, impact resistance and appearance of a molded product, in which PPE and a rubber each having a specific size are dispersed in a matrix of a propylene polymer has been proposed in Japanese Provisional Patent Publication No. 185553/1990. However, in the composition, the matrix is a propylene polymer so that excellent rigidity and heat resistance of PPE cannot be exhibited sufficiently and surface hardness is low. Thus, the composition cannot satisfy recent high level of market requirements.

In the field where high rigidity is required, the blend described above has been filled with a fibrous inorganic filler such as glass fiber and carbon fiber or a plate-shaped inorganic filler such as talc and mica. In this case, it is difficult to solve a problem of warpage of a molded product which is a drawback of a crystalline thermoplastic resin and a problem of poor solvent resistance and moldability which are drawbacks of a non-crystalline thermoplastic resin, whereby there are problems in practical use.

SUMMARY OF THE INVENTION

An object of the present invention is to provide, under the circumstances as described above, a material having both of the respective preferred properties of a crystalline thermoplastic resin and a non-crystalline thermoplastic resin (e.g. a polyolefin type resin and PPE), if necessary, by reinforcing a composition comprising the above resins with an inorganic filler, i.e., a material having excellent molding processability and an excellent balance of mechanical strength, heat resistance, rigidity, impact resistance, chemical resistance and dimensional stability.

Under the circumstances as described above, the present inventors have considered that various characteristics are mainly controlled by a resin which forms a matrix in a composition and come to consider that it is difficult to develop a desired material having the preferred properties described above merely by a composition having a portion in which either a non-crystalline thermoplastic resin (e.g. PPE) or a crystalline thermoplastic resin (e.g. a polyolefin type resin) takes a structure forming a matrix.

Therefore, the present inventors have studied intensively based on a completely new concept and consequently found that a resin composition having extremely good molding processability, mechanical strength, heat resistance, rigidity, impact resistance and dimensional stability which cannot be achieved by the prior art techniques can be obtained by a resin composition in which a portion in which a non-crystalline thermoplastic resin (e.g. PPE) takes a structure forming a matrix and a portion in which a crystalline thermoplastic resin (e.g. a polyolefin type resin) takes a structure forming a matrix coexist and, if necessary, making the inorganic filler exist in a specific phase, to accomplish the present invention.

That is, the present invention relates to a thermoplastic resin composition which comprises:

(a) a non-crystalline thermoplastic resin, (b) a crystalline thermoplastic resin and (c) an inorganic filler, if necessary, wherein a portion in which Component (a) takes a structure forming a matrix and a portion in which Component (b) takes a structure forming a matrix coexist, and a molded product thereof.

The present invention particularly relates to the above thermoplastic resin composition in which Component (a) is a non-crystalline thermoplastic resin comprising PPE or PPE and an aromatic vinyl compound polymer and Component (b) is a crystalline thermoplastic resin comprising a polyolefin type resin, and a molded product thereof.

DESCRIPTION OF THE PREFERRED EMBODIMENTS

Figure 1:
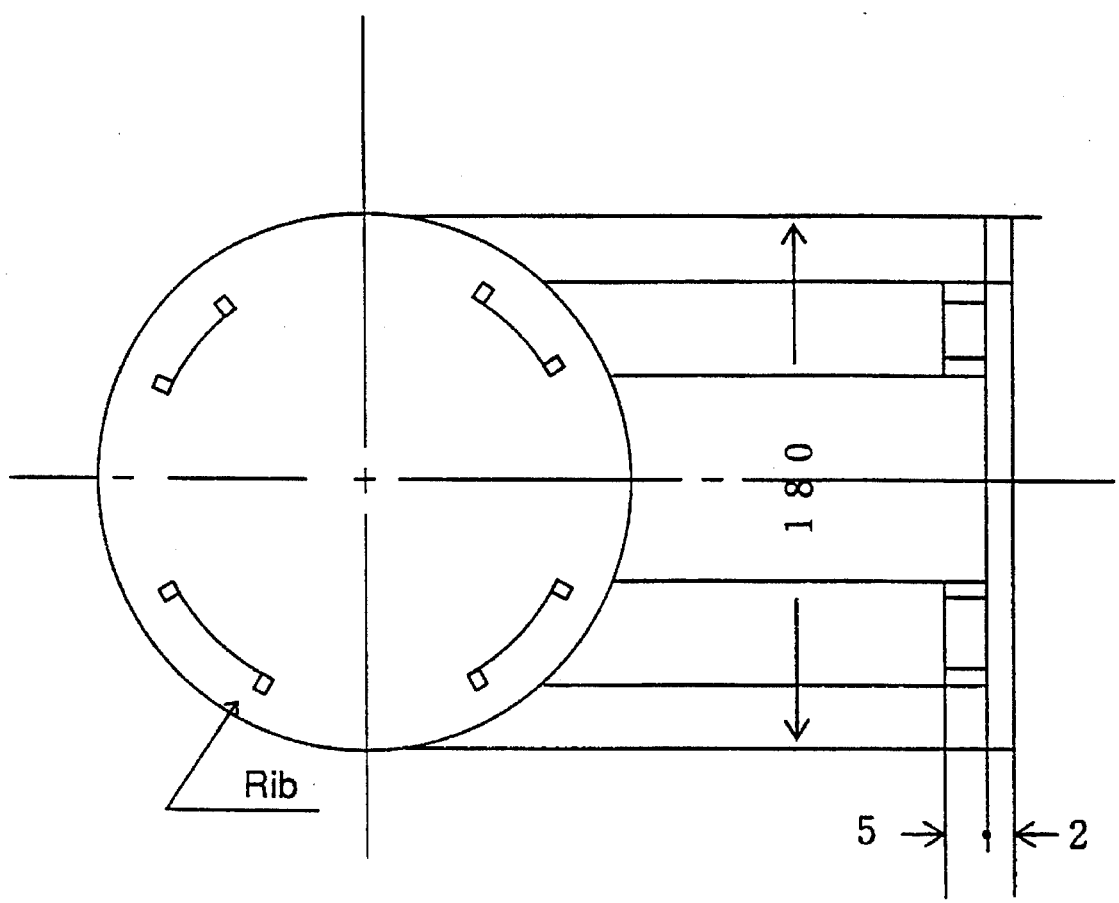
FIG. 1 shows a plane view and a side view of a resin molded product of which a rate of sink mark is measured in Examples 1 to 9 and Comparative examples 1 to 5. The unit of numerical values is mm.

In the following, the present invention is explained in detail.

<Constitutional components>

<Non-crystalline thermoplastic resin (a)>

In the present invention, the non-crystalline thermoplastic resin means a resin generally having glass-like properties and showing only a glass transition temperature when it is heated. Preferred is a non-crystalline thermoplastic resin having a glass transition temperature of 50° C. or higher. The non-crystalline thermoplastic resin does not show a clear melting point nor heat of melting which can be measured, but in the present invention, a thermoplastic resin showing some crystallizability when it is slowly cooled is included and a thermoplastic resin showing crystallizability within the range which does not impair the effect of the present invention significantly is also included. The glass transition temperature, melting point and heat of melting can be measured by using a differential scanning calorimeter, for example, DSC-II (trade name) manufactured by PERKIN-ELMER Co. By using this device, heat of melting can be measured by heating a sample to a temperature which is an estimated melting point or higher at a temperature-elevating rate of 10° C. per 1 minute, cooling the sample to 20° C. at a cooling rate of 10° C. per 1 minute, leaving the sample to stand for about 1 minute and then heating the sample at a temperature-elevating rate of 10° C. per 1 minute. Among the values of heat of melting measured in cycles of elevating temperature and lowering temperature, the constant value within experimental error in either of the cycles is used. The non-crystalline thermoplastic resin (a) to be used in the present invention is defined to have heat of melting measured by the above method of less than 1 calorie/gram.

As the non-crystalline thermoplastic resin to be used as Component (a) of the present invention, there may be mentioned PPE, an aromatic vinyl compound polymer, a rubber-modified aromatic vinyl compound polymer, a polycarbonate, an acrylonitrile-styrene copolymer resin and an acrylonitrile-butadiene-styrene copolymer resin. The non-crystalline thermoplastic resin (a) is a resin comprising at least one non-crystalline thermoplastic resin selected from the group consisting of the resins described above.

As one preferred non-crystalline thermoplastic resin (a), there may mentioned PPE. PPE is a homopolymer or copolymer comprising a structure unit represented by the formula (I):

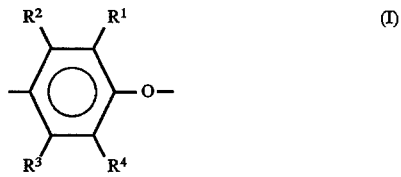

wherein $R^1$, $R^2$, $R^3$ and $R^4$ are selected from the group consisting of a hydrogen atom, a halogen atom, a cyano group, a substituted or unsubstituted hydrocarbon group such as an alkyl group having 1 to 6 carbon atoms and an alkoxy group having 1 to 6 carbon atoms, and an aryl group such as a substituted or unsubstituted phenyl group, respectively, and may be the same or different from each other.

As a specific example of PPE, there may be mentioned poly-(2,6-dimethyl-1,4-phenylene ether), poly(2,6-diethyl-1,4-phenylene ether), poly(2,6-dipropyl-1,4-phenylene ether), poly(2-methyl-6-isopropyl-1,4-phenylene ether), poly(2,6-dimethoxy-1,4-phenylene ether), poly(2,6-dichloromethyl-1,4-phenylene ether), poly(2, 6-diphenyl-1,4-phenylene ether), poly(2,6-dinitrile-1,4-phenylene ether), poly(2,6-dichloro-1,4-phenylene ether), poly(2,5-dimethyl-1,4-phenylene ether) and so on. These PPEs may be used in combination.

As a preferred homopolymer of PPE, there may be mentioned, for example, a homopolymer comprising a 2,6-dimethyl-1,4-phenylene ether unit. As a preferred copolymer, there may be mentioned a random copolymer comprising a combination of the above unit and a 2,3,6-trimethyl-1,4-phenylene ether unit.

PPE to be used in the present invention has an intrinsic viscosity measured at 30° C. in chloroform of preferably 0.2 to 0.8 dl/g, more preferably 0.2 to 0.5 dl/g, particularly preferably 0.25 to 0.45 dl/g.

The aromatic vinyl compound polymer to be used as the non-crystalline thermoplastic resin (a) of the present invention is a homopolymer or copolymer of an aromatic vinyl compound derived from a compound having a structure represented by the formula (II):

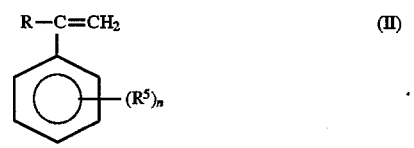

wherein R represents a hydrogen atom, a lower alkyl group having 1 to 6 carbon atoms, a lower alkoxy group having 1 to 6 carbon atoms or a halogen atom; $R^5$ represents a lower alkyl group having 1 to 6 carbon atoms, a lower haloalkyl group having 1 to 6 carbon atoms, a chlorine atom, a nitro group, a cyano group or a vinyl group; and n represents an integer of 0 to 5.

As the aromatic vinyl compound, there may be mentioned, for example, styrene, α-methylstyrene, α-methoxystyrene, methylstyrene, dimethylstyrene, 2,4,6-trimethylstyrene, chlorostyrene, dichlorostyrene, bromostyrene, nitrostyrene, chloromethylstyrene, cyanostyrene and t-butylstyrene. Among them, styrene, α-methylstyrene and methylstyrene are preferred. These compounds may be used singly or in combination of two or more.

As the polycarbonate to be used as the non-crystalline thermoplastic resin (a) in the present invention, there may be mentioned an aromatic polycarbonate, an aliphatic polycarbonate and an aliphatic-aromatic polycarbonate. Among them, preferred are aromatic polycarbonates comprising 2,2-bis(4-oxyphenyl)alkane type, bis(4-oxyphenyl)ether type or bis(4-oxyphenyl)sulfone, sulfide or sulfoxide type bisphenols. If necessary, a polycarbonate comprising bisphenols substituted by a halogen may be used. The molecular weight of the polycarbonate is not particularly limited, but it is generally 10,000 or more, preferably 20,000 to 40,000 in terms of weight average molecular weight.

As other non-crystalline thermoplastic resin (a), there may be used a rubber-modified aromatic vinyl compound polymer, an acrylonitrile-styrene copolymer resin and an acrylonitrile-butadiene-styrene copolymer resin.

The non-crystalline thermoplastic resin (a) of the present invention is preferably a non-crystalline thermoplastic resin comprising PPE or PPE and the aromatic vinyl compound polymer.

<Crystalline thermoplastic resin (b)>

The crystalline thermoplastic resin to be used as Component (b) in the present invention is a resin which can be melted by heating, has non-glass-like properties with a clear crystalline structure or molecular structure and shows heat of melting which can be measured and a clear melting point. The melting point and heat of melting can be measured by using a differential scanning calorimeter, for example, by using the device and measurement method described in <Non-crystalline thermoplastic resin (a)>. The crystalline thermoplastic resin (b) to be used in the present invention is defined to have heat of melting measured by the above method of more than 1 calorie/gram.

As the crystalline thermoplastic resin (b), there may be mentioned a polyolefin type resin, a polyamide, a polyester, a polyacetal resin, a halogen-containing thermoplastic resin and a polysulfone resin. The crystalline thermoplastic resin (b) is a resin comprising at least one crystalline thermoplastic resin selected from the group consisting of the resins described above.

As the polyolefin type resin which is a preferred crystalline thermoplastic resin (b), there may be mentioned a homopolymer of an α-olefin, a copolymer of α-olefins and a copolymer containing one or plural kinds of α-olefins as a main component and, if necessary, one or plural kinds of other unsaturated monomers as a subsidiary component. The copolymer herein mentioned may be any copolymer such as a block, random or graft copolymer or a composite thereof. A modified polymer obtained by subjecting the above olefin type polymer to chlorination, sulfonation or carbonylation is also included.

As the above α-olefin, there may be mentioned, for example, ethylene, propylene, butene-1, pentene-1, hexene-1, heptene-1 and octene-1. From the point of availability, an α-olefin having 2 to 8 carbon atoms is preferred. As the above unsaturated monomer, there may be mentioned, for example, an unsaturated organic acid such as (meth)acrylic acid and maleic acid, an ester thereof or an acid anhydride thereof.

As a specific example of the above polyolefin type resin, there may be mentioned a low-density polyethylene, a medium-density polyethylene, a high-density polyethylene, a polypropylene, a polybutene and an ethylene-propylene block or random copolymer. These resins may be used in combination. Among them, as the polyolefin type resin, preferred is a crystalline olefin polymer, for example, a crystalline homopolymer of ethylene or propylene, or a crystalline copolymer mainly comprising ethylene or propylene with other ethylenic unsaturated monomer. Among them, particularly preferred are a low-, medium- or high-density polyethylene, a polypropylene and an ethylene-propylene block copolymer, and above all, a high-density polyethylene, a polypropylene and an ethylene-propylene block copolymer are most preferred from the point of rigidity.

The polyolefin type resin to be used in the present invention has a melt flow rate (230° C., load: 2.16 kg, hereinafter referred to as "MFR") of preferably 0.01 to 250 g/10 min, more preferably 0.05 to 200 g/10 min, further preferably 0.05 to 150 g/10 min, particularly preferably 0.1 to 100 g/10 min, most preferably 0.1 to 50 g/10 min. If MFR is lower than the above range, molding processability is insufficient, while if it exceeds the above range, the level of mechanical strength is low.

In the present invention, as a part of the polyolefin type resin, a derivative obtained by modifying said polyolefin type resin by incorporating functional groups. The functional group-modified derivative herein mentioned is a derivative obtained by graft modifying the polyolefin type resin by an unsaturated organic acid or an acid anhydride thereof (e.g. acrylic acid, maleic acid, itaconic acid or an acid anhydride thereof) or an unsaturated organic silane compound (e.g. vinyl trimethoxysilane, vinyl triethoxysilane, vinyl triacetoxysilane, γ-methacryloxypropyltrimethoxysilane or propenyltrimethoxysilane), or an ionomer obtained by graft modifying the polyolefin type resin by the above unsaturated organic acid or acid anhydride thereof and then replacing a part of hydrogen atoms of carboxyl groups bonded to a graft chain of the resulting graft modified polyolefin type resin with metal ions. Further, in addition to the above specific examples, there may be also used a functional group-modified derivative of the polyolefin type resin into which hydrophilic groups are introduced by a graft, block or random copolymerization method, a substitution reaction or an oxidation reaction.

The polyamide to be used as the crystalline thermoplastic resin (b) in the present invention is a polyamide which has a —CONH— bond in a polymer main chain and can be melted by heating. As a representative example thereof, there may be mentioned nylon 4, nylon 6, nylon 6,6, nylon 4,6, nylon 12 and nylon 6,10 (all trade names), and a known low-degree crystalline or non-crystalline polyamide containing a monomer component such as aromatic diamine and aromatic dicarboxylic acid may be also used. A preferred polyamide is nylon 6 or nylon 6,6, and a particularly preferred polyamide is nylon 6. The polyamide to be used in the present invention has a relative viscosity (measured in 98% conc. sulfuric acid a 25° C.) of preferably 2.0 to 8.0.

As the polyester which is one example of the crystalline thermoplastic resin (b), there may be mentioned, for example, a thermoplastic polyester prepared by condensing an aromatic or aliphatic dicarboxylic acid or a lower alkyl ester thereof, an acid halide or an acid anhydride derivative and an aromatic or aliphatic glycol or a divalent phenol according to a conventional method.

As a specific example of the aromatic or aliphatic dicarboxylic acid suitable for preparing the above thermoplastic polyester, there may be mentioned oxalic acid, malonic acid, succinic acid, glutaric acid, adipic acid, suberic acid, azelaic acid, sebacic acid, terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid or 2,7-naphthalenedicarboxylic acid, or a mixture of these carboxylic acids.

As specific examples of the acid halide, acid anhydride and lower alkyl ester of the aromatic or aliphatic dicarboxylic acid, there may be mentioned acid halide derivatives, acid anhydride derivatives and lower alkyl esters (methyl and ethyl esters) of the aromatic or aliphatic dicarboxylic acids described above.

As the aliphatic glycol suitable for preparing the thermoplastic polyester, there may be mentioned a straight alkylene glycol having 2 to 12 carbon atoms, for example, ethylene glycol, 1,3-propylene glycol, 1,4-butanediol, 1,6-hexanediol and 1,12-dodecanediol. As the aromatic glycol compound, there may be mentioned p-xylylene glycol, and as a divalent phenol, there may be mentioned pyrocatechol, resorcinol, hydroquinone or alkyl-substituted derivatives of these compounds. Other suitable glycols may include 1,4-cyclohexanedimethanol.

As other preferred thermoplastic polyester, there may be mentioned a polyester obtained by ring opening polymerization of a lactone, for example, polypivalolactone and poly(ε-caprolactone).

Further, as other preferred thermoplastic polyester, there may be mentioned a thermotropic liquid crystal polymer (TLCP) which forms liquid crystal in a melted state. As a representative TLCP which is commercially available, there may be mentioned X7G (trade name) produced by Eastman Kodak Co., Xydar (trade name) produced by Datoco Co., Ekonol (trade name) produced by Sumitomo Kagaku Co. and Vectra (trade name) produced by Celanese Co.

Among the thermoplastic polyesters described above, polyethylene terephthalate (PET), polybutylene terephthalate (PBT), polyethylene naphthalate (PEN), poly(1,4-cyclohexanedimethylene terephthalate)(PCT) and a liquid crystal polyester are thermoplastic polyesters preferably used in the thermoplastic resin composition of the present invention.

The thermoplastic polyester to be used in the present invention has an intrinsic viscosity measured at 20° C. in a mixed solution of phenol/1,1,2,2-tetrachloroethane=60/40% by weight of preferably 0.5 to 5.0 dl/g, more preferably 1.0 to 4.0 dl/g, particularly preferably 2.0 to 3.5 dl/g. If the intrinsic viscosity is less than 0.5 dl/g, impact resistance is insufficient, while if it exceeds 5.0 dl/g, moldability is insufficient.

As the polyacetal to be used as the crystalline thermoplastic resin (b) in the present invention, there may be mentioned, for example, a high molecular weight acetal homopolymer prepared by polymerizing formaldehyde or trioxane. The polyacetal prepared from formaldehyde has a high molecular weight and has a structure represented by the following formula:

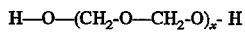

wherein the terminal group is derived from a controlled amount of water; and x represents the number of formaldehyde units bonded in a head-tail bonding form (preferably about 1,500).

In order to increase heat resistance and chemical resistance, the terminal group is generally converted into an ester group or an ether group. The polyacetal herein mentioned further includes a polyacetal copolymer. As an example of the above copolymer, there may be mentioned a block copolymer of formaldehyde and a monomer or prepolymer of other substance which can provide an active hydrogen, for example, alkylene glycol, polythiol, a vinyl acetate(meth)acrylic acid and/or (meth)acrylate copolymer or a hydrogenated butadiene-acrylonitrile copolymer. Formaldehyde or trioxane can be copolymerized with other aldehyde, a cyclic ether, a vinyl compound, a ketene, a cyclic carbonate, an epoxide, an isocyanate or an ether. As a specific example of the above compounds, there may be mentioned ethylene oxide, 1,3-dioxane, 1,3-dioxene, epichlorohydrin, propylene oxide, isobutylene oxide and styrene oxide.

As the halogen-containing thermoplastic resin which can be used as the crystalline thermoplastic resin (b) in the present invention, there may be mentioned polymers such as polytetrafluoroethylene, polychlorotrifluoroethylene and polyvinylidene fluoride. In addition to the above polymers, a homopolymer or copolymer derived from vinylidene chloride may be also used. Among them, a preferred halogen-containing thermoplastic resin is a homopolymer or copolymer of vinylidene fluoride or a copolymer of crystalline vinylidene chloride.

As the polysulfone which can be used as the crystalline thermoplastic resin (b) in the present invention, there may be mentioned a polysulfone having at least several number of the recurring unit represented by the formula (III):

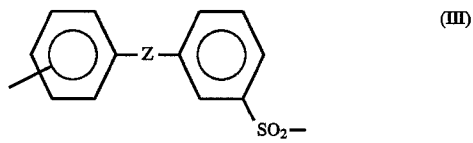

wherein Z represents oxygen, sulfur or an aromatic diol residue, for example, a polysulfone having either of the recurring units represented by the following formulae:

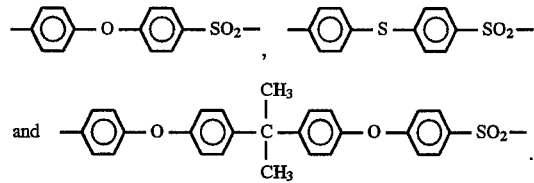

As other crystalline thermoplastic resin (b), there may be mentioned polyphenylene sulfide and a liquid crystal polymer.

In the present invention, as other component which can be added, there may be mentioned a block copolymer comprising an aromatic vinyl compound polymer block A and a conjugated diene compound polymer block B, and a hydrogenated product thereof. The block copolymer herein mentioned is an aromatic vinyl compound-conjugated diene block copolymer having a structure comprising at least one chain block A derived from an aromatic vinyl compound and at least one block B derived from conjugated diene. The sequence of the blocks A and B may include a linear structure, a branched structure and a taper structure. In a part of these structures, a random chain derived from a random copolymer portion of the aromatic vinyl compound and conjugated diene may be included. Among the above, a sequence having a linear structure is preferred, and a sequence having a triblock structure is more preferred.

The hydrogenated product of the block copolymer is a block copolymer in which the number of aliphatic unsaturated bonds of the block B is reduced by hydrogenation. The rate of unsaturated bonds which are not hydrogenated to remain as such is not particularly limited, but it is preferably 20% or less, more preferably 10% or less. The hydrogenated product of the block copolymer may be used in combination with an unhydrogenated block copolymer.

The aromatic vinyl compound is preferably styrene, α-methylstyrene, p-methylstyrene, vinyl toluene or vinyl xylene, particularly preferably styrene. The conjugated diene is preferably 1,3-butadiene or 2-methyl-1,3-butadiene.

As a specific example of the block copolymer, there may be mentioned a styrene-butadiene-styrene block copolymer and a styrene-isoprene-styrene block copolymer, and plural kinds of these copolymers may be used in combination.

The ratio of the recurring unit derived from the aromatic vinyl compound in the aromatic vinyl compound-conjugated diene block copolymer is preferably in the range of 10 to 80% by weight, more preferably 15 to 65% by weight.

As a measure of the molecular weight of the block copolymer or the hydrogenated product thereof, a viscosity value at 25° C. in a toluene solution is preferably in the range of 30,000 to 10 cP, more preferably 10,000 to 30 cP. If the value exceeds 30,000 cP, molding processability of a final composition is insufficient, while if it is less than 10 cP, a mechanical strength level is undesirably low.

The crystalline thermoplastic resin (b) of the present invention is preferably a crystalline thermoplastic resin comprising the polyolefin type resin.

<inorganic filler (c)>

As the inorganic filler (c) to be used in the present invention, there may be used various known fibrous and/or plate-shaped inorganic fillers.

The fibrous inorganic filler to be used in the present invention has L/D which is a ratio of a fiber length (L) to a fiber diameter (D) of preferably 5 or more from the point of a reinforcing effect. As one example of such a fibrous inorganic filler, there may be mentioned glass fiber, carbon fiber, whiskers such as potassium titanate, and wallastonité. These fillers may be used in combination of two or more.

The plate-shaped inorganic filler to be used in the present invention has L'/D' which is a ratio of an average plate size (L') to an average plate thickness (D') of preferably 5 or more from the point of a reinforcing effect. As one example of such a plate-shaped inorganic filler, there may be mentioned mica, talc and glass flake. These fillers may be used in combination of two or more.

The above inorganic filler may be preferably subjected to surface treatment depending on the resin to be used.

It is preferred that the inorganic filler (c) substantially exists in the non-crystalline thermoplastic resin (a). As a method of making the inorganic filler (c) selectively exist in the desired resin component, there may be mentioned (1) a method of previously kneading the inorganic filler (c) and the desired resin; (2) a method of introducing functional groups showing an affinity for the inorganic filler (c) into the desired resin; and (3) a method of using a resin having functional groups showing an affinity for the inorganic filler (c), for example, a polycarbonate. As a method of introducing functional groups showing an affinity for the inorganic filler (c) into the desired resin, there may be used various known methods, for example, a method of subjecting the desired resin and a compound having both of an unsaturated group and a functional group in the same molecule to a graft reaction in a solution state or a melted state in the presence or absence of a peroxide and a method of carrying out copolymerization with a compound having functional groups when the resins are polymerized.

The functionalized resin described above may be used singly or may be mixed with an unfunctionalized resin. When the functionalized resin is mixed with an unfunctionalized resin, the rate of the functionalized compound in the resulting mixture is preferably 0.01% by weight or more, more preferably 0.05% by weight or more, particularly preferably 0.1% by weight or more.

As other components which can be added to the thermoplastic resin composition of the present invention, if necessary, there may be used, for example, an antioxidant, a weather resistance improver, a nucleating agent, a flame retardant, an impact modifier, a plasticizer and a fluidity improver which have been conventionally known in the thermoplastic resin. It is effective for improving rigidity, heat resistance or dimensional stability to add an organic filler, a reinforcing agent and other inorganic filler, for example, calcium carbonate, silica or clay. Also, various coloring agents or dispersants thereof which have been conventionally known may be used practically.

<Structure of the resin composition or molded product thereof>

The thermoplastic resin composition or a molded product thereof of the present invention comprises a composition comprising the non-crystalline thermoplastic resin (a) and the crystalline thermoplastic resin (b), wherein a portion in which Component (a) takes a structure forming a matrix and a portion in which Component (b) takes a structure forming a matrix coexist.

For example, there may be considered a portion in which Component (a) takes a structure forming a matrix and Component (b) takes a structure forming a domain (Portion of structure (A)); a portion in which Component (b) takes a structure forming a matrix and Component (a) takes a structure forming a domain (Portion of structure (B)); and a portion in which Component (a) and Component (b) take a structure forming a continuous phase (i.e., a matrix) mutually (sea-sea structure, Portion of structure (C)). The embodiment in which a portion in which Component (a) takes a structure forming a matrix and a portion in which Component (b) takes a structure forming a matrix coexist refers to an embodiment in which Portion of structure (A), Portion of structure (B) and Portion of structure (C) exist in various places in the thermoplastic resin composition or a molded product thereof.

As the embodiment of the present invention, there may be mentioned, for example, an embodiment in which Portion of structure (A) exists in the vicinity of the surface layer of the molded product and Portion of structure (B) exists at the inner portion therefrom, or alternatively an embodiment in which Portion of structure (B) exists in the vicinity of the surface layer of the molded product and Portion of structure (A) exists at the inner portion therefrom. As a matter of course, Portions of structures (A), (B) and (C) may exist twice or more times in the thickness direction of the molded product. There may be also considered an embodiment in which only Portion of structure (C) exists.

Here, the above Portions of structures (A), (B) and (C) can be confirmed by dyeing the thermoplastic resin composition or a molded product thereof with ruthenium tetraoxide, preparing an extremely thin section and observing the section by using a transmission type electron microscope.

<Melt shear viscosity ratio of Component (a) to Component (b)>

The conditions for enabling the embodiment of the present invention are that in a certain composition ratio, when the melt shear viscosity ratio (S) of Component (a) to Component (b) at 280° C. and a shear rate of 30 $sec^{-1}$ is larger than the melt shear viscosity ratio ($W_1$) of Component (a) to Component (b) in a sea-sea structure (Portion of structure (C)) at 280° C. and a shear rate of 30 $sec^{-1}$, the melt shear viscosity ratio (T) of Component (a) to Component (b) at 300° C. and a shear rate of 300 $sec^{-1}$ is smaller than the melt shear viscosity ratio ($W_2$) of Component (a) to Component (b) in a sea-sea structure (Portion of structure (C)) at 300° C. and a shear rate of 300 $sec^{-1}$; or when S is smaller than $W_1$, T is larger than $W_2$.

Preferred conditions for enabling the embodiment of the present invention are that the volume ratio of Component (a) to Component (b) is 10:90 to 90:10, and when S is larger than $W_1$ and less than 100, T is smaller than $W_2$ or when S is smaller than $W_1$ and more than 0.1, T is larger than $W_2$.

More preferred conditions are that the volume ratio of Component (a) to Component (b) is 10:90 to 85:15, and when S is larger than $W_1$ and less than 50, T is smaller than $W_2$; or when S is smaller than $W_1$ and more than 0.2, T is larger than $W_2$.

In a general thermoplastic resin composition comprising Component (a) and Component (b), $W_1$ and $W_2$ show substantially approximate or same values in many cases.

The melt shear viscosity herein mentioned refers to a shear viscosity (shearing viscosity) measured according to the method described as a reference test of JIS K 7210, i.e., by extruding a melted resin from a capillary tube at a constant rate. As a specific device, there may be mentioned an elevated flow tester (Instron capillary rheometer). By using the above device, the melt shear viscosity can be measured, for example, at various temperatures by setting a nozzle size to 1 mm and a nozzle length to 10 mm and changing an extrusion rate.

<Composition ratio of constitutional components>

The composition ratio of Component (a) and Component (b) described above with tot&l weight of Component (a) and Component (b) being 100% by volume is shown below.

The ratio of Component (a) is preferably 10 to 90% by volume, more preferably 10 to 85% by volume. If the ratio is less than 10% by volume, Component (a) hardly forms a matrix and characteristics possessed by Component (a), for example, heat resistance and dimensional stability are insufficient.

The ratio of Component (b) is preferably 90 to 10% by volume, more preferably 90 to 15% by volume. If the ratio is less than 10% by volume, Component (b) hardly forms a matrix and characteristics possessed by Component (b), for example, moldability and solvent resistance are insufficient.

The content of Component (c) is preferably 0 to 60% by weight, more preferably 5 to 60% by weight, further preferably 7 to 60% by weight, particularly preferably 10 to 60% by weight based on the amount of the whole composition. If the ratio exceeds 60% by weight, moldability is insufficient.

<Preparation and molding method of composition>

As a method of obtaining the thermoplastic resin composition of the present invention, there may be used a method of kneading the above components by using any kneader such as a single axial or plural axial kneader, a Banbury mixer, a roll mixer and a Brabender Plastograph and then solidifying the mixture by cooling and a dissolving and mixing method in which the above components are added to a suitable solvent, for example, a hydrocarbon such as hexane, heptane, benzene, toluene and xylene or a derivative thereof and components soluble in each other are mixed or soluble components and insoluble components are mixed in a suspended state. From the point of industrial cost, a melting and kneading method is preferred, but the preparation method of the present invention is not limited thereto.

A molding method of the thermoplastic resin composition of the present invention is not particularly limited, and there may be suitably used a molding method generally used for a thermoplastic resin composition, e.g., various molding methods such as injection molding, blow molding, extrusion molding, sheet molding, thermal molding, rotary molding and lamination molding.

EXAMPLES

The present invention is described in detail by referring to Examples.

Examples 1 to 9 and Comparative examples 1 to 5

The following respective components were used.
(1) PPE: poly(2,6-dimethyl-1,4-phenylene ether) (produced by Nippon Polyether Co., intrinsic viscosity measured at 30° C. in chloroform: 0.41 dl/g, hereinafter referred to as "PPE")
(2) Polycarbonate: polycarbonate Upiron S2000 (trade name, produced by Mitsubishi Gas Kagaku Co., viscosity average molecular weight: $2.5 \times 10^4$, hereinafter referred to as "PC")
(3) Aromatic vinyl compound polymers:
polystyrene HF77 (trade name, produced by Mitsubishi Kasei Corporation, hereinafter referred to as "PS") and
Rubber-modified polystyrene HT76 (trade name, produced by Mitsubishi Petrochemical Co., Ltd., hereinafter referred to as "HIPS")
(4) Polyolefin type resins:
polypropylene: Mitsubishi Polypropylene TA8 (trade name, produced by Mitsubishi Petrochemical Co., Ltd., hereinafter referred to as "PP"),
high-density polyethylene: Mitsubishi Polyethylene-HD HY330B (trade name, produced by Mitsubishi Petrochemical Co., Ltd., MFR: 0.5 g/10 min (measured at 190° C., 2.16 kg), hereinafter referred to as "PE1"),
high-density polyethylene: Shorex Super 4551H (trade name, produced by Showa Denko Co., MFR: 0.02 g/10 min (190° C., 2.16 kg), hereinafter referred to as "PE2"),
high-density polyethylene (trial production, MFR: 0.3 g/10 min (190° C., 21.6 kg), hereinafter referred to as "PE3"),
linear low-density polyethylene: Mitsubishi Polyethylene-LL ethylene-LL DNDB1077 (trade name, produced by Mitsubishi Petrochemical Co., Ltd., MFR: 90 g/10 min (190° C., 2.16 kg), hereinafter referred to as "PE7"),
high-density polyethylene: Mitsubishi Polyethylene-HD HF310 (trade name, produced by Mitsubishi Petrochemical Co., Ltd., MFR: 0.06 g/10 min (190° C., 2.16 kg), hereinafter referred to as "PE4") and
maleic anhydride-graft modified high-density polyethylene (grafted rate of maleic anhydride: 0.8% by weight, hereinafter referred to as "MMHD")
(5) Hydrogenated products of aromatic vinyl compound-conjugated diene block copolymer:
a hydrogenated product of a styrene-butadiene-styrene copolymer Kraton G1650 (trade name, produced by Shell Chemical Co., styrene unit content: 30% by weight, hereinafter referred to as "SEBS1"),
a hydrogenated product of a styrene-butadiene-styrene copolymer Kraton G1651 (trade name, produced by Shell Chemical Co., styrene unit content: 30% by weight, hereinafter referred to as "SEBS2") and
a hydrogenated product of a styrene-butadiene-styrene copolymer Kraton G1652 (trade name, produced by Shell Chemical Co., styrene unit content: 30% by weight, hereinafter referred to as "SEBS3")
(6) Inorganic filler: calcium carbonate (produced by Mitsubishi Petrochemical Co., Ltd., average particle size: 0.3 μm, hereinafter referred to as "$CaCO_3$")

Kneading and molding of compositions

The respective components were melted and kneaded by using a TEX 44 biaxial kneading extruder (trade name, manufactured by Nippon Seikosho Co.) at a cylinder temperature of 210° C. and a screw rotary number of 200 rpm to prepare preliminary kneaded products.

Next, the preliminary kneaded products were subjected to injection molding by using an injection molding machine J100SS2A (trade name, manufactured by Nippon Seikosho Co.) under conditions of a cylinder temperature of 280° C. and a metal mold temperature of 60° C. to prepare molded products. The molded products were evaluated according to the methods described below, and the results are shown in Tables 1 and 2.

Figure 3:
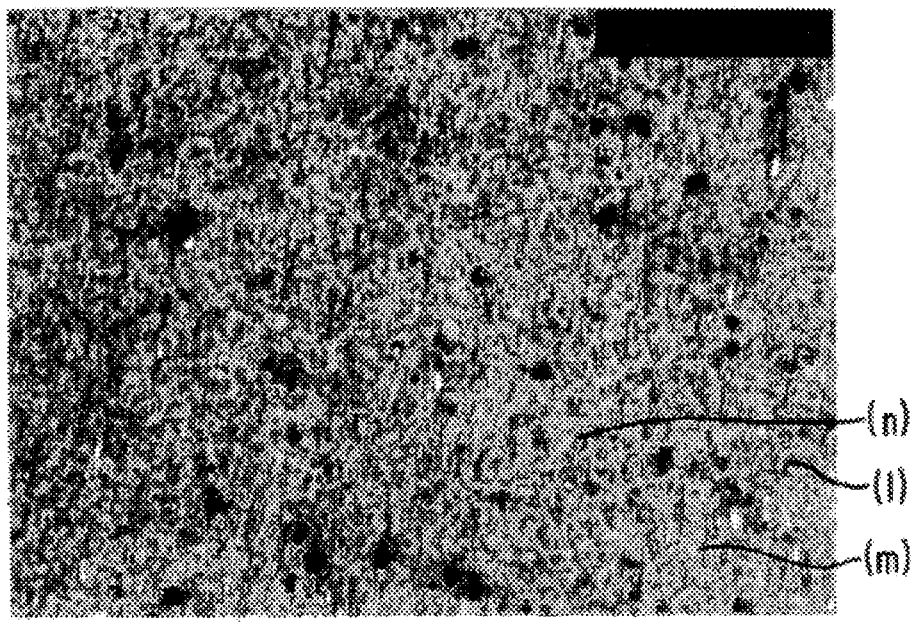
FIG. 3 is a transmission type electron microscope photograph (7,500 magnifications) showing the respective components, obtained by observing around the vicinity of the surface (parallel to the direction of injection molding) of the resin molded product prepared in Example 3 in the direction of thickness, wherein (l) represents a portion of a hydrogenated product of a styrene-butadiene-styrene copolymer, (m) represents a PPE portion, and (n) represents a polyethylene portion.
Figure 4:
FIG. 4 is a transmission type electron microscope photograph (7,500 magnifications) showing the respective components, obtained by observing the 0.1 mm-inner portion from the surface of the resin molded product observed in FIG. 3, from the direction of surface, wherein (l), (m) and (n) have the same meanings as defined above.
Figure 5:
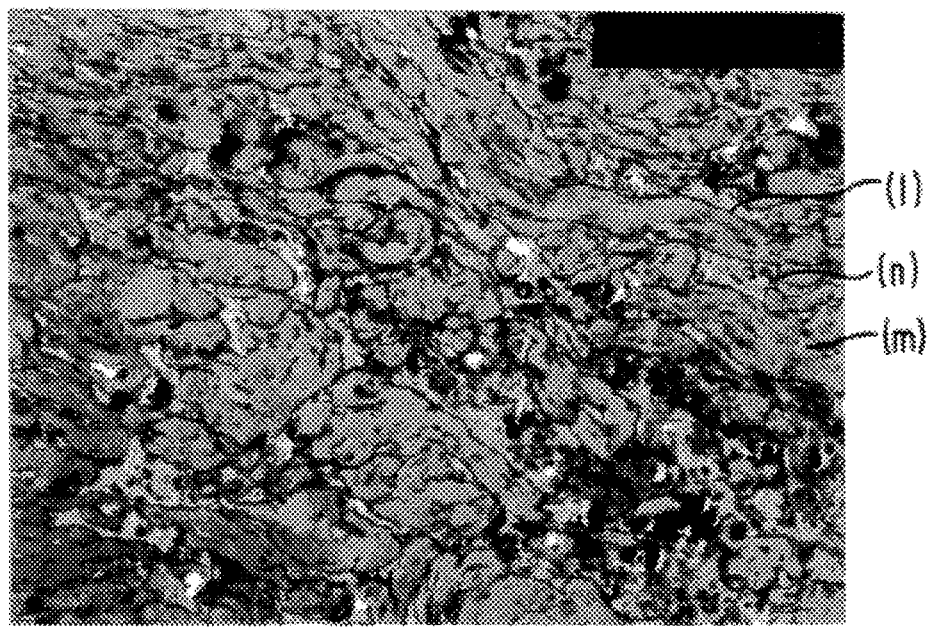
FIG. 5 is a transmission type electron microscope photograph (7,500 magnifications) showing the respective components, obtained by observing the 0.2 mm-inner portion from the surface of the resin molded product observed in FIG. 3, from the direction of surface, wherein (l), (m) and (n) have the same meanings as defined above.

Transmission type electron microscope photographs (7,500 magnifications) of the vicinity of the surface, the 0.1 mm-inner portion from the surface and the 0.2 mm-inner portion from the surface of the molded product obtained in Example 3 are shown in FIG. 3, FIG. 4 and FIG. 5, respectively. It can be seen that while the matrix phase in the vicinity of the surface is PPE, the matrix phase at the 0.2 mm-inner portion therefrom is polyethylene.

Evaluation methods
(1) Measurement of MFR
MFR was measured according to JIS K 7210 at 280° C. with a load of 5.0 kg.
(2) Izod impact test
Izod impact test with notch was conducted according to JIS K 7110.
(3) Measurement of flexural modulus and flexural strength
Three-point flexural test was conducted by the flexural test method according to JIS K 7203.

(4) Drop weight impact

An iron ball having a weight of 400 g was dropped to a central portion of the molded product at 30° C., and the lowest height from which the molded product was cracked by the iron ball was measured.

(5) Measurement of heat distortion temperature

Load deflection test was conducted according to JIS K 7207 with a load of 4.6 kg.

(6) Rate of sink mark

A molded product with a rib (1 to 3 mmt) on its back surface shown in FIG. 1 was prepared by using an in-line type injection molding machine (manufactured by Nippon Seikosho Co., mold clamping force: 150 T) at a cylinder temperature of 280° C. and a mold temperature of 60° C.

The rate of sink mark on the surface of the rib portion of the molded product obtained was measured by using Roncom 50A-310 (trade name, manufactured by Tokyo Seimitsu Co.).

(7) Rate of warpage

Figure 2:
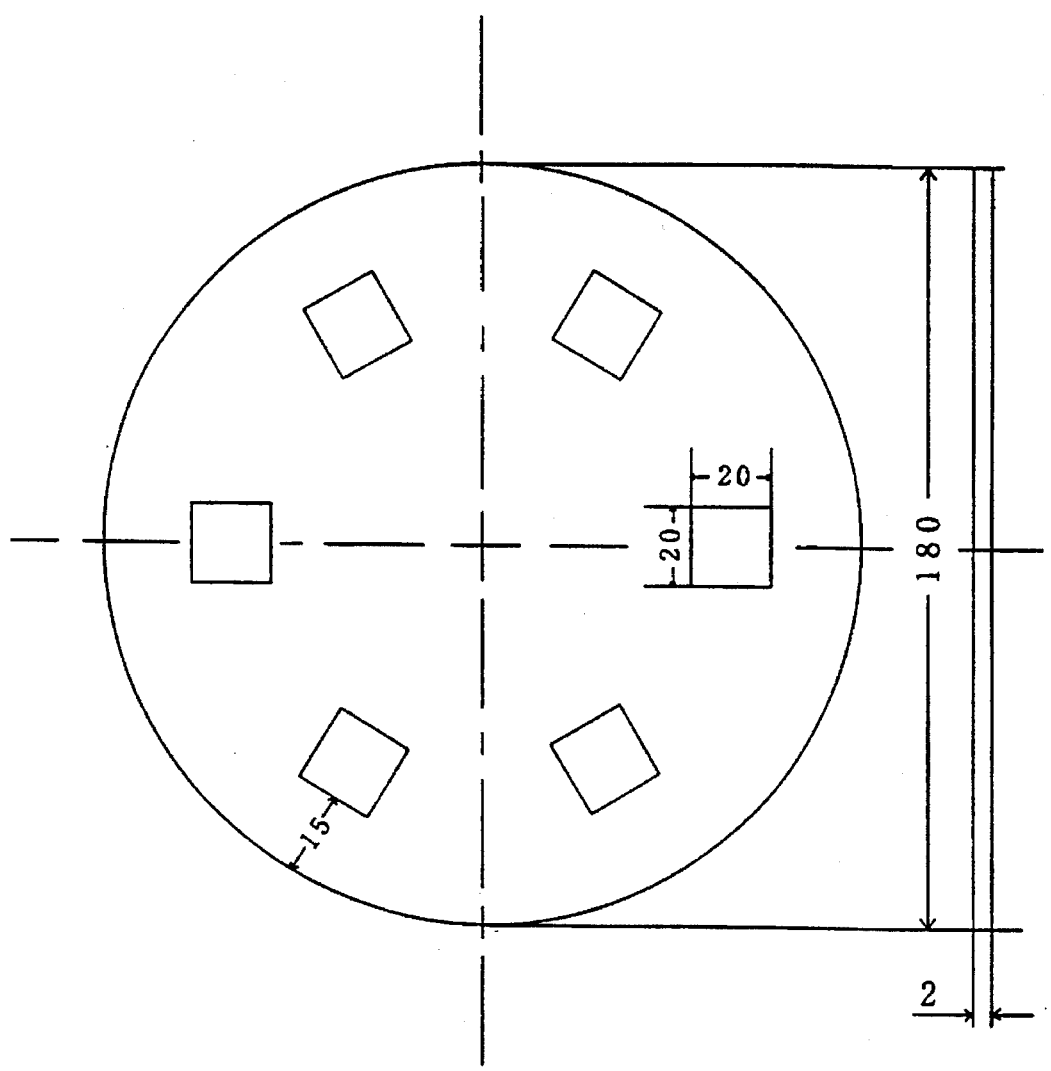
FIG. 2 shows a plane view and a side view of a resin molded product of which a rate of warpage is measured in Examples 1 to 13 and Comparative examples 1 to 9. The unit of numerical values is mm.

A molded product shown in FIG. 2 was prepared by using an in-line type injection molding machine (manufactured by Nippon Seikosho Co., mold clamping force: 150 T) at a cylinder temperature of 280° C. and a mold temperature of 60° C.

The molded product was put on a flat stand, and the maximum displacement from a horizontal plane was measured to determine a rate of warpage.

(8) Chemical resistance

After a tensile test dumbbell specimen JIS No. 1 was dipped in lead-free gasoline at 23° C. for 1 week, elongation at tensile break of the dipped specimen was measured to determine a retention percentage based on elongation at tensile break of an undipped specimen.

(9) Luster

Luster was measured according to JIS Z 8741 at an incident angle of 60° and a light-receiving angle of 60°.

(10) Discoloration by weathering

After lightness and hue (Lab value) were measured according to JIS Z 8722 (a method of measuring a color of an object), an accelerated weathering test (irradiation illuminance: 150 W/m$^2$, 630° C., humidity: 50%, no rain) was conducted for 168 hours by using a xenon weather meter XEL-3W (trade name, manufactured by Suga Shikenki Co.) to measure a change of a color tone. The change of the color tone was represented by a difference ($\Delta E$) according to JIS Z 8730 (a method of representing a color difference) by using a color tone before weathering as a standard.

$$\Delta E = \Delta L^2 + \Delta a^2 + \Delta b^2$$

wherein L represents lightness; a represents a reddish degree (+a: red, −a: green); and b represents a yellowish degree (+b: yellow, −b: blue).

The lightness and hue were measured by a hue and color difference meter 1001DP (trade name, manufactured by Nihon Denshoku Kogyo Co.

(1) Linear expansion coefficient

Linear expansion coefficient was measured according to JIS K 6714.

(12) Appearance

Appearance was judged by visual observation with naked eyes. In Tables 1 and 2, ○ means "good" and Δ means "not good".

(13) Observation of structure

A molded piece obtained by injection molding was cut off, and surface polishing operation of the molded piece was carried out in the directions parallel and perpendicular to the injection molding direction. The resulting sample was dyed with ruthenium tetraoxide as described below.

The sample and ruthenium tetraoxide were charged into a vessel which could be tightly closed to effect dyeing at 50° C. for 1 hour. An extremely thin section having a thickness of 0.1 μm was prepared by using an extremely thin section microtome. The section was observed by a transmission type electron microscope JEM100CX (trade name, manufactured by Nihon Denshi Co.). Mixed existence type P (referred to as "Mix P" in Tables 1 and 2) means a structural portion in which a matrix phase of PPE and a domain phase of the polyolefin type resin exist in the vicinity of the sheet surface, i.e., Portion of structure (A) and a matrix phase of the polyolefin type resin and a domain phase of PPE exist at the slightly inner portion therefrom, i.e., Portion of structure (B). Mixed existence type Q (referred to as "Mix Q" in Tables 1 and 2) means a structural portion in which a matrix phase of the polyolefin type resin and a domain phase of PPE exist in the vicinity of the sheet surface, i.e., Portion of structure (B) and a matrix phase of PPE and a domain phase of the polyolefin type resin exist at the slightly inner portion therefrom, i.e., Portion of structure (A). PPE matrix type (referred to as "PPE matrix" in Tables 1 and 2) means a structural portion in which all matrix phases are PPE and all domain phases are the polyolefin type resin, and PO matrix type (referred to as "PO matrix" in Tables 1 and 2) means a structural portion in which all matrix phases are the polyolefin type resin and all domain phases are PPE.

In FIGS. 3, 4 and 5, it is shown that each black portion is the hydrogenated product of the styrene-butadiene-styrene copolymer (l) and exists at the interface of PPE (m) and the polyethylene (n) (a slender linear portion is polyethylene lamella).

TABLE 1

| Composition (part by volume) | Example | | | | | | | | |
|---|---|---|---|---|---|---|---|---|---|
| | 1 | 2 | 3 | 4 | 5 | 6 | 7 | 8 | 9 |
| PPE/PC | PPE 47 | PPE 37 | PPE 47 | PPE 46 | PPE 47 | PPE 47 | PPE 47 | PPE 44 | PC 44 |
| Polystyrene | PS 32 | PS 25 | PS 32 | PS 31 | PS 32 | PS 32 | PS 32 | PS 30 | — |
| Polyolefin type resin | PE1 16 | PE428 | PE1 16 | PP 23 | PE1 22 | PE1 16 | PE1 16 | PE1 27 | PP 56 |
| Maleated polyethylene | MMHD 5 | MMHD 10 | MMHD 5 | — | — | MMHD 5 | MMHD 5 | — | — |
| Hydrogenated product of block copolymer | SEBS3 10 | SEBS3 10 | SEBS1 10 | SEBS3 10 | SEBS3 10 | SEBS3 10 | — | — | — |
| Inorganic filler (CaCO$_3$) (% by weight in the whole composition) | 6 | 6 | 6 | — | 6 | — | 6 | — | — |
| Evaluation results | | | | | | | | | |
| Structure | Mix P | Mix Q | Mix P | Mix P | Mix P | Mix P | Mix P | Mix P | Mix P |

TABLE 1-continued

| Composition | Example | | | | | | | | |
|---|---|---|---|---|---|---|---|---|---|
| (part by volume) | 1 | 2 | 3 | 4 | 5 | 6 | 7 | 8 | 9 |
| Melt shear viscosity ratio of Component (a) to Component (b) | | | | | | | | | |
| S (280° C., shear rate: 30 sec$^{-1}$) | 4.020 | 2.204 | 4.020 | 9.469 | 3.650 | 4.020 | 4.020 | 3.650 | 1.622 |
| T (300° C., shear rate: 300 sec$^{-1}$) | 1.076 | 0.851 | 1.076 | 2.500 | 0.929 | 1.076 | 1.076 | 0.929 | 4.114 |
| Moldability | | | | | | | | | |
| MFR 280° C. (g/10 min) | 15 | 8 | 13 | 46 | 28 | 30 | 12 | 12 | 5 |
| Rate of warpage (mm) | 0.2 | 0.3 | 0.1 | 0.3 | 0.4 | 0.2 | 0.1 | 0.4 | 0.1 |
| Rate of sink mark (μm) | 3 | 4 | 4 | 2 | 4 | 3 | 4 | 2 | 2 |
| Rib thickness: 2 mm | | | | | | | | | |
| Mechanical strength | | | | | | | | | |
| Izod impact strength | | | | | | | | | |
| 23° C. (kgf/cm$^2$) | 15 | 24 | 12.3 | 6.4 | 11.5 | 12.0 | 6.0 | 5.5 | 5.4 |
| −30° C. (kgf/cm$^2$) | 5 | 7.6 | 3.9 | 2.5 | 4.0 | 4.0 | 3.0 | 3.8 | — |
| Flexural modulus 23° C. (kgf/cm$^2$) | 20000 | 14500 | 22440 | 21350 | 20000 | 20500 | 23000 | 23000 | 18000 |
| Flexural strength | 740 | 450 | 790 | 720 | 700 | 700 | 720 | 870 | — |
| Drop weight impact 400 g (cm) | 80 | 85 | 75 | 80 | 70 | 70 | 65 | 70 | — |
| Heat distortion temperature °C. | 138 | 126 | 140 | 121 | 139 | 138 | 142 | 138 | 120 |
| Linear expansion coefficient × 10$^{-5}$ | 6.0 | 7.0 | 5.5 | 6.1 | 6.0 | 6.0 | 5.5 | 5.5 | 7.0 |
| Chemical resistance (lead-free gasoline) Retention percentage (%) | 104 | 102 | 98 | 107 | 100 | 99 | 101 | 102 | 98 |
| Discoloration by weathering ΔE | 7 | 6 | 7 | 5 | 8 | 6 | 5 | 8 | 2 |
| Luster | 86 | 72 | 82 | 80 | 84 | 74 | 77 | 75 | 75 |
| Appearance | ○ | ○ | ○ | ○ | ○ | ○ | ○ | ○ | ○ |

TABLE 2

| Composition | Comparative example | | | | |
|---|---|---|---|---|---|
| (part by volume) | 1 | 2 | 3 | 4 | 5 |
| PPE | PPE 47 | PPE 47 | PPE 53 | PPE 47 | PPE 50 |
| Polystyrene | PS 32 | PS 32 | PS 36 | PS 32 | HIPS 50 |
| Maleated polyethylene | MMHD 5 | MMHD 5 | MMHD 3 | MMHD 5 | — |
| Hydrogenated product of block copolymer | SEBS2 10 | SEBS3 10 | SEBS2 10 | SEBS3 10 | — |
| Inorganic filler (CaCO$_3$) (% by weight in the whole composition) | 6 | 6 | 6 | 6 | — |
| Evaluation results | | | | | |
| Structure | PPE matrix | PPE matrix | PPE matrix | PO matrix | PPE matrix |
| Melt shear viscosity ratio of Component (a) to Component (b) | | | | | |
| S (280° C., shear rate: 30 sec$^{-1}$) | 1.152 | 0.494 | 1.152 | 26.71 | — |
| T (300° C., shear rate: 300 sec$^{-1}$) | 0.630 | 0.392 | 0.630 | 7.399 | — |
| Moldability | | | | | |
| MFR 280° C. (g/10 min) | 6.1 | 12 | 11.6 | 26.6 | 12.8 |
| Rate of warpage (mm) | 0.2 | 0.3 | 0.3 | 0.4 | 2.6 |
| Rate of sink mark (μm) | 5 | 5 | 6 | 5 | 8 |
| Rib thickness: 2 mm | | | | | |
| Mechanical strength | | | | | |
| Izod impact strength | | | | | |
| 23° C. (kgf/cm$^2$) | 10.6 | 14.8 | 13.3 | 5.9 | 6.6 |
| −30° C. (kgf/cm$^2$) | 7.0 | 6.2 | 5.1 | 3.9 | 4.1 |
| Flexural modulus 23° C. (kgf/cm$^2$) | 20730 | 17890 | 22500 | 11740 | 25200 |
| Flexural strength | 720 | 660 | 680 | 350 | 960 |
| Drop weight impact 400 g (cm) | 40 | 40 | 30 | 40 | 40 |
| Heat distortion temperature °C. | 139 | 139 | 138 | 115 | 133 |
| Linear expansion coefficient × 10$^{-5}$ | 8.0 | 8.0 | 7.0 | 9.5 | 6.5 |
| Chemical resistance (lead-free gasoline) Retention percentage (%) | 66 | 68 | 65 | 98 | 65 |
| Discoloration by weathering ΔE | 14 | 15 | 13 | 8 | 17 |
| Luster | 80 | 79 | 85 | 81 | 43 |
| Appearance | Δ | Δ | ○ | Δ | ○ |

From the results of the above evaluation tests, it can be seen that in the molded product of the thermoplastic resin composition comprising a non-crystalline thermoplastic resin (a) and a crystalline thermoplastic resin (b) wherein a portion in which Component (a) takes a structure forming a matrix and a portion in which Component (b) takes a structure forming a matrix coexist, a balance of mechanical strength, moldability, dimensional characteristic, solvent resistance and appearance is extremely excellent as compared with the molded product of the thermoplastic resin composition in which Component (a) forms a matrix and Component (b) forms a domain phase; or the molded product of the thermoplastic resin composition in which Component (b) forms a matrix and Component (a) forms a domain phase. Also, the molded product of the thermoplastic resin composition of the present invention has excellent chemical resistance and resistance to discoloration by weathering and also good appearance. Thus, the molded product of the thermoplastic resin composition of the present invention can be used for various purposes, and it can be an industrially useful material.

Examples 10 to 13 and
Comparative examples 6 to 9

The following respective components were used.
(1) PPE: the same PPE used above (PPE)
(2) Polycarbonate: the same polycarbonate used above (PC)
(3) Polystyrene: the same polystyrene used above (PS)
(4) Maleic anhydride-modified PPE/PS:

One part by weight of maleic anhydride (reagent first grade) was formulated based on 100 parts by weight in total of 60 parts by weight of PPE and 40 parts by weight of PS. The mixture was sufficiently stirred by using a Henschel mixer and then melted and kneaded by using a biaxial extruder (manufactured by Nippon Seikosho Co.) at a cylinder temperature of 250° C. and a screw rotary number of 250 rpm, followed by cooling, to obtain pellets (the resulting resin is hereinafter referred to as "M-PPE"). The resulting M-PPE had a graft polymerization rate of maleic anhydride of 0.4% by weight according to infrared spectroscopic analysis.

(5) Polyolefin type resins:
high-density polyethylene: Mitsubishi Polyethylene-HD EY40H (trade name, produced by Mitsubishi Petrochemical Co., Ltd., MFR : 1.4 g/10 min (190° C., 2.16 kg), hereinafter referred to as "PE5"),
high-density polyethylene: Shorex Super 4551H (trade name, produced by Showa Denko Co., MFR : 0.02 g/10 min (190° C., 2.16 kg), hereinafter referred to as "PE2"),
high-density polyethylene: Mitsubishi Polyethylene-HD JX10 (trade name, produced by Mitsubishi Petrochemical Co., Ltd., MFR: 20 g/10 min (190° C., 2.16 kg), hereinafter referred to as "PE6"),
the same maleic anhydride-graft modified high-density polyethylene used above (MMHD) and
the same polypropylene used above (PP)
(6) Hydrogenated product of aromatic vinyl compound-conjugated diene block copolymer: the same product used above (SEBS3)
(7) Fibrous inorganic filler: glass fiber having a diameter of 10 μm and a length of 3 mm
(8) Plate-shaped inorganic filler: mica having an average thickness of 2 μm and an average particle size of 90 μm Kneading and molding of compositions While the respective components were melted and kneaded by using a biaxial kneading extruder (manufactured by Nippon Seikosho Co.) at a cylinder temperature of 230° C. and a screw rotary number of 250 rpm, the fibrous or plate-shaped inorganic filler was added from a feeding port provided midway in the cylinder to obtain reinforced resin compositions.

Next, the reinforced resin compositions were subjected to injection molding by using an injection molding machine (manufactured by Nippon Seikosho Co., mold clamping force: 100 T) at a cylinder temperature of 280° C. and a metal mold temperature of 60° C. to prepare molded products. The molded products were evaluated according to the methods described below, and the results are shown in Table 3.

Figure 6:
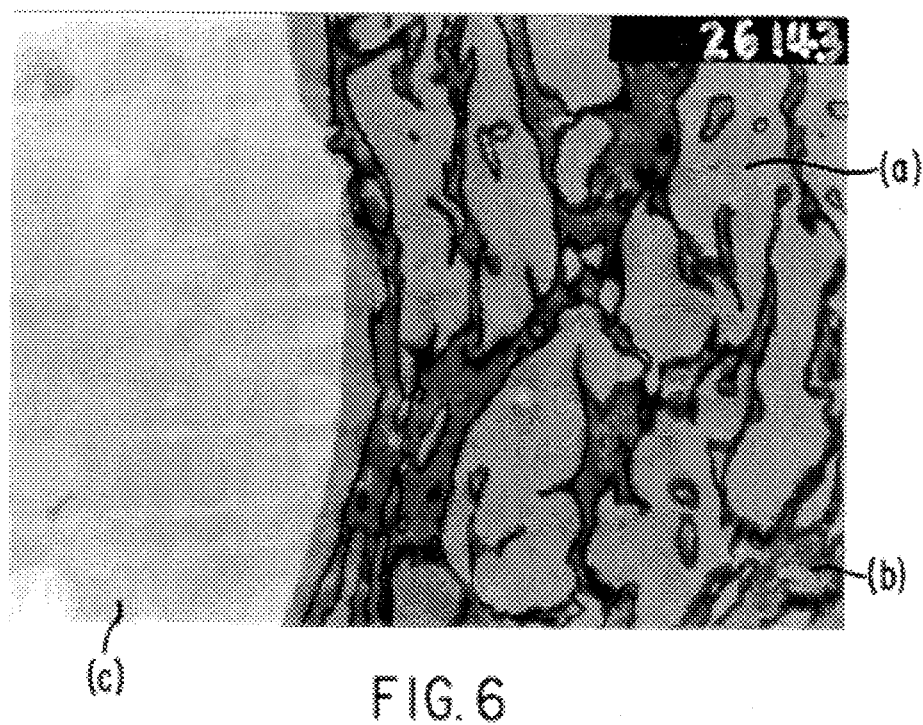
FIG. 6 is a photograph of a structure obtained by observing the resin molded product prepared in Example 10 from the direction at a right angle to the direction of injection by using a transmission type electron microscope (7,500 magnifications), wherein (a) represents a maleic anhydride-modified polyphenylene ether/polystyrene, (b) represents a high-density polyethylene and (c) represents glass fiber.
Figure 7:
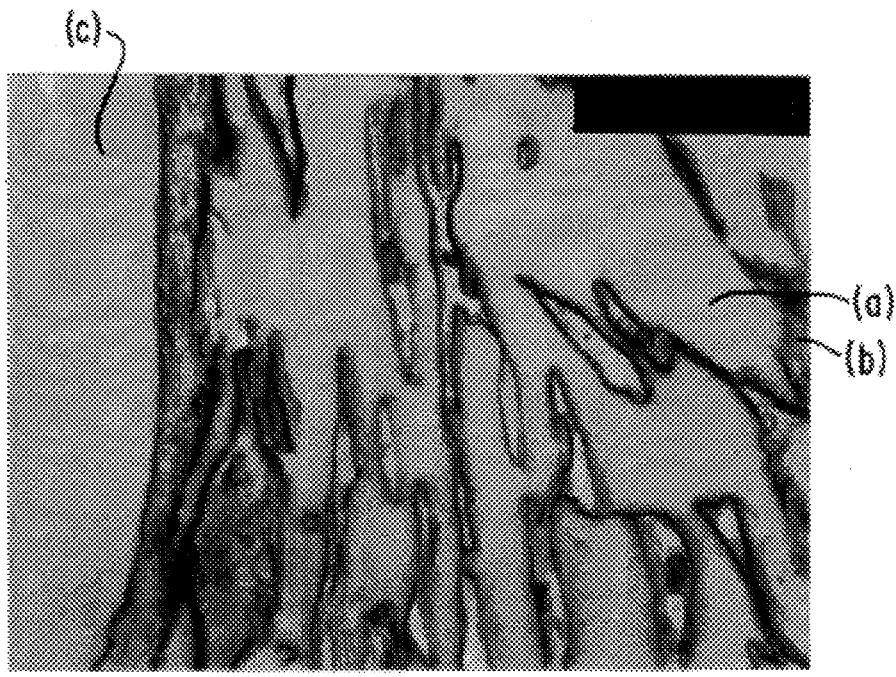
FIG. 7 is a photograph of a structure obtained by observing the resin molded product prepared in Comparative example 6 from the direction at a right angle to the direction of injection by using a transmission type electron microscope (7,500 magnifications), wherein (a), (b) and (c) have the same meanings as defined above.

The molded products of the resin compositions obtained were observed by a transmission type electron microscope (7,500 magnifications) and photographs thereof are shown in FIGS. 6 and 7. In the figures, white portions are M-PPE and black portions are the polyolefin type resin.

FIG. 6 is a photograph of the resin molded product prepared in Example 10 obtained by observing it from the direction at a right angle to the direction of injection. It can be seen that the glass fiber is surrounded by M-PPE. FIG. 7 is a photograph of the resin molded product prepared in Comparative example 6 obtained by observing it in the same manner. It can be seen that the glass fiber is surrounded by PE5.

Figure 8:
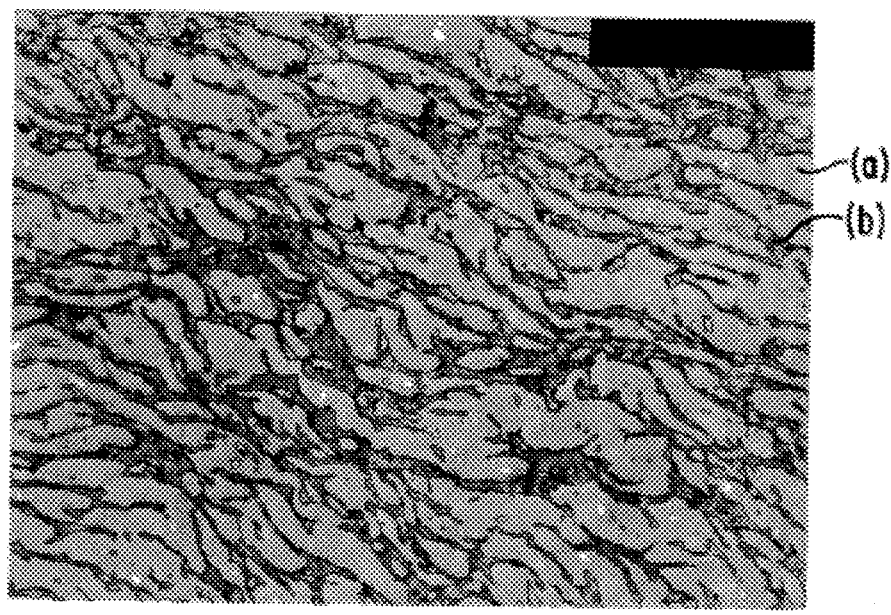
FIG. 8 is a photograph of a structure obtained by observing the 0.5 mm-inner portion from the surface layer of the resin molded product prepared in Example 10 from the direction at a right angle to the direction of injection by using a transmission type electron microscope (7,500 magnifications), wherein (a) and (b) have the same meanings as defined above.

FIG. 8 is a photograph of the resin molded product prepared in Example 10 obtained by observing the 0.5 mm-inner portion from the surface layer thereof in the same manner.

Figure 9:
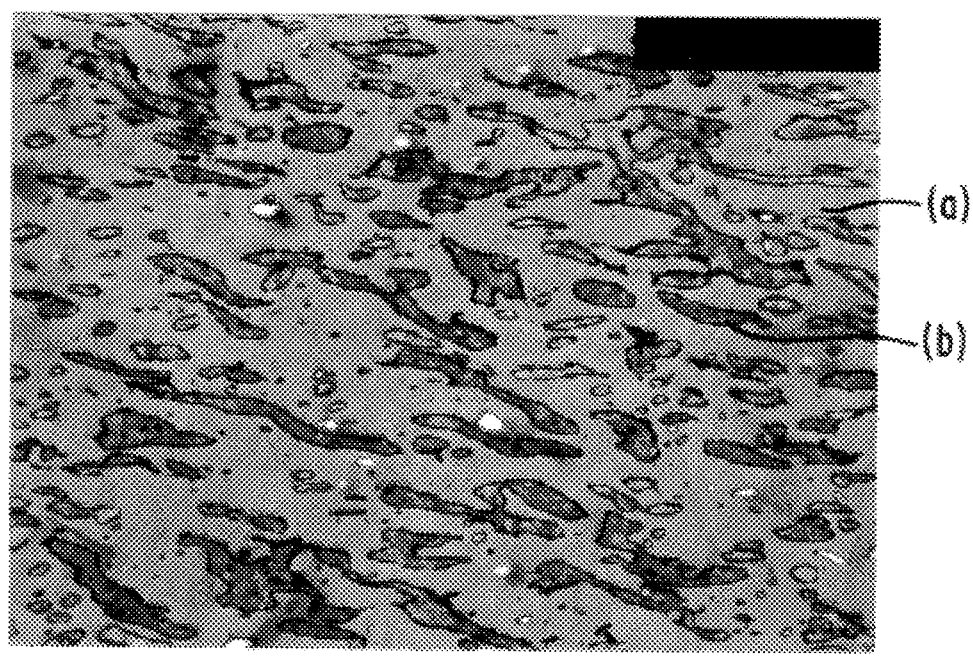
FIG. 9 is a photograph of a structure obtained by observing the 1.0 mm-inner portion from the surface layer of the same portion of the sample observed in FIG. 8, from the direction at a right angle to the direction of injection by using a transmission type electron microscope (7,500 magnifications), wherein (a) and (b) have the same meanings as defined above.

FIG. 9 is a photograph of the resin molded product prepared in Example 10 obtained by observing the 1.0 mm-inner portion from the surface layer thereof in the same manner. In FIG. 8, PE5 is a matrix and in FIG. 9, M-PPE is a matrix. From these results, it can be seen that portions in which Component (a) is a matrix and portions in which Component (b) is a matrix coexist.

Evaluation methods
(1) Measurement of MFR

MFR was measured according to JIS K 7210 at 280° C. with a load of 5.0 kg.

(2) Izod impact test

Izod impact test with notch was conducted according to JIS K 7110.

(3) Measurement of flexural modulus

Three-point flexural test was conducted by the flexural test method according to JIS K 7203.

(4) Measurement of heat distortion temperature

Load deflection test was conducted according to JIS K 7207 with a load of 18.6 kg.

(5) Rate of warpage

A molded product shown in FIG. 2 was prepared by using an in-line type injection molding machine (manufactured by Nippon Seikosho Co., mold clamping force: 150 T) at a cylinder temperature of 280° C. and a mold temperature of 60° C.

The molded product was put on a flat stand, and the maximum displacement from a horizontal plane was measured to determine a rate of warpage.

(6) Chemical resistance

After a tensile test dumbbell specimen JIS No. 1 was dipped in lead-free gasoline at 23° C. for 1 week, tensile strength of the dipped specimen was measured to determine a retention percentage based on tensile strength of an undipped specimen.

(7) Linear expansion coefficient

Linear expansion coefficient was measured according to JIS K 6714 at 23 to 80° C.

(8) Observation of structure

Observation was carried out in the same manner as in Examples 1 to 9. The existing place of the inorganic filler was also confirmed by the method described above. Mixed existence type P (referred to as "Mix P" in Table 3) means a structural portion in which a matrix phase of the non-crystalline thermoplastic resin (a) and a domain phase of the crystalline thermoplastic resin (b) exist in the vicinity of the sheet surface, i.e., Portion of structure (A) and a matrix phase of the crystalline thermoplastic resin (b) and a domain phase of the non-crystalline thermoplastic resin (a) exist at the slightly inner portion therefrom, i.e., Portion of structure (B). PPE/PS matrix type (referred to as "PPE/PS matrix" in Table 3) means a structural portion in which all matrix phases are PPE/PS (a) and all domain phases are the crystalline thermoplastic resin (b). PO matrix type (referred to as "PO matrix" in Table 3) means a structural portion in which all matrix phases are the polyolefin type resin (b) and all domain phases are the non-crystalline thermoplastic resin (a). PC matrix type (referred to as "PC matrix" in Table 3) means a structural portion in which all matrix phases are the polycarbonate (a) and all domain phases are the crystalline thermoplastic resin (b).

From the results of the above evaluation tests, it can be seen that in the thermoplastic resin composition and the molded product thereof of the present invention, a balance of mechanical strength, moldability, dimensional stability and solvent resistance is extremely excellent as compared with the case when the inorganic filler is added to the thermoplastic resin composition in which Component (a) forms a matrix alone and Component (b) form a domain alone; or the case when the inorganic filler is added to the thermoplastic resin composition in which Component (b) forms a matrix alone and Component (a) forms a domain alone. Thus, the thermoplastic resin composition and the molded product of the present invention can be used for various purposes, and they can be industrially useful materials.

We claim:

1. A molded product of a thermoplastic resin composition which comprises:

(a) 10–85% by volume, based on the total volume of the resin composition, of a non-crystalline thermoplastic resin comprising a polyphenylene ether or a polyphenylene ether and an aromatic vinyl compound polymer; and (b) 90–15% by volume, based on the total volume of the resin composition, of a polyolefin resin;

wherein said components form:

(A) a structure in which component (a) forms a matrix and component (b) forms a domain, and (B) a structure in which component (b) forms a matrix and component (a) forms a domain, wherein (A) and (B) coexist as layers in the thickness direction of the molded product, wherein said product satisfies the following conditions that when the melt shear viscosity ratio (S) of Component (a) to Component (b) at 280° C. and a shear rate of 30 $\sec^{-1}$ is larger than the melt shear viscosity ratio ($W_1$) of component (a) to Component (b) in a sea-sea structure at 280° C. and a shear rate of 30 $\sec^{-1}$, the melt shear viscosity ratio (T) of Component (a) to Component (b) at 300° C. and a shear rate of 300 $\sec^{-1}$ is smaller than the melt shear viscosity ratio ($W_2$) of Component (a) to Component (b) in a sea-sea structure at 300° C. and a shear rate of 300 $\sec^{-1}$; or when S is smaller than $W_1$, T is larger than $W_2$.

2. The product according to claim 1, wherein the polyolefin resin comprises at least one selected from the group consisting of a high density polyethylene, a polypropylene and an ethylene-propylene block copolymer.

TABLE 3

| Composition | Example | | | | Comparative Example | | | |
|---|---|---|---|---|---|---|---|---|
| | 10 | 11 | 12 | 13 | 6 | 7 | 8 | 9 |
| Non-crystalline thermoplastic resin | M-PPE | M-PPE | M-PPE | PC | PPE 48 | M-PPE | M-PPE | PC |
| (a) (part by weight) | 80 | 90 | 90 | 50 | PS 32 | 90 | 50 | 95 |
| Crystalline thermoplastic resin (b) | PE5 | PE5 | PE5 | PP | PE5 15 | PE2 | PE6 | PE6 |
| (part by weight) | 20 | 10 | 10 | 50 | MMHD 5 | 10 | 50 | 5 |
| Volume ratio of (a)/(b) | 78/22 | 89/11 | 89/11 | 43/57 | 78/22 | 89/11 | 47/53 | 94/6 |
| Other component (part by weight) | SEBS3 10 | — | SEBS3 5 | — | SEBS3 10 | — | SEBS3 5 | — |
| Fibrous inorganic filler (c) glass fiber (% by weight in whole composition) | 30 | 40 | 25 | 40 | 30 | 40 | 25 | 40 |
| Plate-shaped inorganic filler (c) mica (% by weight in whole composition) | — | — | 15 | — | — | — | 15 | — |
| Evaluation results | | | | | | | | |
| Structure | Mix P | Mix P | Mix P | Mix P | Mix P | M-PPE matrix | PO matrix | PC matrix |
| Melt shear viscosity ratio of Component (a) to Component (b) | | | | | | | | |
| S (280° C., shear rate: 30 $\sec^{-1}$) | 6.93 | 6.93 | 6.93 | 1.62 | 6.79 | 1.54 | 46.18 | 7.00 |
| T (300° C., shear rate: 300 $\sec^{-1}$) | 1.57 | 1.57 | 1.57 | 4.53 | 1.65 | 0.66 | 7.33 | 7.56 |
| Place where inorganic filler exists | M-PPE | M-PPE | M-PPE | PC | PE5 | M-PPE | M-PPE | PC |
| MFR (g/10 min) | 15 | 13 | 12 | 20 | 6 | 5 | 20 | 3 |
| Flexural modulus (kg/cm$^2$) | 65000 | 104000 | 85000 | 95000 | 56000 | 105000 | 60000 | 112000 |
| Izod impact strength (kg · cm/cm$^2$) | 8 | 7 | 6 | 8 | 9 | 7 | 7 | 8 |
| Heat distortion temperature (18.6 kg) °C. | 150 | 150 | 148 | 140 | 140 | 150 | 130 | 145 |
| Chemical resistance (%) | 97 | 92 | 93 | 90 | 96 | 72 | 99 | 54 |
| Rate of warpage (mm) | 1.5 | 1.2 | 0.8 | 1.6 | 2.6 | 1.2 | 3.5 | 1.5 |
| Linear expansion coefficient (× 10) (mm/mm °C.) | 2.0 | 1.8 | 2.3 | 2.2 | 2.1 | 1.9 | 2.6 | 2.1 |

3. The product according to claim 1, wherein Component (a) is a mixture of a polyphenylene ether and an aromatic vinyl compound polymer.

4. The molded product of claim 1, comprising 44–79% by volume component (a) and 56–21% by volume of component (b).

5. The molded product of claim 1, wherein said crystalline polyolefin resin is a low-density polyethylene, a medium-density polyethylene, a high-density polyethylene, a polypropylene, a polybutene or a ethylene propylene block or random copolymer.

6. The molded product of claim 1, wherein said aromatic vinyl compound polymer is a polymer of styrene, α-methoxystyrene, methylstyrene, dimethylstyrene, 2,4,6-trimethylstyrene, chlorostyrene, dichlorostyrene, bromostyrene, nitrostyrene, chloromethylstyrene, cyanostyrene or t-butylstyrene or a mixture thereof.

7. The molded product of claim 1, wherein said aromatic vinyl compound polymer is a polymer of styrene, α-methoxystyrene or methylstyrene or a mixture thereof.

* * * * *